United States Patent
Gottschalk et al.

(10) Patent No.: US 8,853,902 B2
(45) Date of Patent: Oct. 7, 2014

(54) DISPLACEMENT DRIVE, IN PARTICULAR WINDOW LIFTER DRIVE

(75) Inventors: Danny Werner Gottschalk, Gernsbach (DE); Thomas Huck, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 13/383,139

(22) PCT Filed: May 10, 2010

(86) PCT No.: PCT/EP2010/056349
§ 371 (c)(1),
(2), (4) Date: Feb. 23, 2012

(87) PCT Pub. No.: WO2011/003649
PCT Pub. Date: Jan. 13, 2011

(65) Prior Publication Data
US 2012/0139371 A1 Jun. 7, 2012

(30) Foreign Application Priority Data
Jul. 10, 2009 (DE) .......................... 10 2009 027 610

(51) Int. Cl.
*H02K 11/00* (2006.01)
(52) U.S. Cl.
USPC ........................................ 310/68 R; 310/71

(58) Field of Classification Search
USPC ......................................... 310/68 R, 71, 75 R
See application file for complete search history.

(56) References Cited

U.S. PATENT DOCUMENTS

| | | | |
|---|---|---|---|
| 5,528,093 A * | 6/1996 | Adam et al. .................... | 310/89 |
| 6,191,512 B1 | 2/2001 | Lekeux et al. | |
| 6,713,913 B1 | 3/2004 | Hager et al. | |
| 6,756,711 B2 * | 6/2004 | Matsuyama et al. ........ | 310/68 R |
| 6,969,933 B2 * | 11/2005 | Mao et al. ................... | 310/75 R |
| 7,183,682 B2 * | 2/2007 | Yamashita et al. .......... | 310/75 R |
| 2002/0149283 A1 | 10/2002 | Hager et al. | |
| 2005/0280324 A1 | 12/2005 | Yamashita et al. | |

OTHER PUBLICATIONS

PCT/EP2010/056349 International Search Report dated Oct. 27, 2010 (4 pages).

* cited by examiner

*Primary Examiner* — Hanh Nguyen
(74) *Attorney, Agent, or Firm* — Michael Best & Friedrich LLP

(57) ABSTRACT

The present invention relates to a displacement drive (1) comprising an electric motor (2), an output shaft (3), a printed circuit board (4) and a connection interface (5), the electric motor (2) making contact with the printed circuit board (4) and being designed to drive the output shaft (3), and the connection interface (5) comprising a direct plug connection with contact making pads (38) directly on the printed circuit board (4), and the contact making pads being designed to make direct contact with spring contacts of a plug.

21 Claims, 3 Drawing Sheets

DISPLACEMENT DRIVE, IN PARTICULAR WINDOW LIFTER DRIVE

BACKGROUND OF THE INVENTION

The present invention relates to an adjustment drive, in particular for use as a window lifter drive in a motor vehicle, comprising an electric motor, an output shaft, a printed circuit board and a connection interface.

The prior art discloses window lifter drives with electronic printed circuit boards, with different functionalities, for example the trapping-prevention function, being realized in these drives. In order to connect the window lifter drives to customer-end, that is to say vehicle-end, interfaces, the housings of these drives have plug collars. Drive-end plug pins or spring contacts are formed in these plug collars. These plug pins are soldered into or pressed into the printed circuit board of the window lifter drive. The window lifter drive-end interface is therefore formed by projecting pins. In this case, the printed circuit boards are installed parallel or perpendicular to a screwing-on plane of the window lifter drive.

SUMMARY OF THE INVENTION

The adjustment drive according to the invention now makes it possible, in particular by using the direct plug connection, to dispense with the drive-end plug pins or spring contacts. Dispensing with drive-end spring contacts leads to a completely new interface and contact-making concept which creates significant cost savings both in respect of die production and in respect of the individual parts and in respect of assembly. Furthermore, the resulting simpler housing structure with the spring contacts has various advantages in respect of the flexible design of the housing die as regards implementing a very wide variety of interface designs. As a further consequence of the advantageous direct plug connection, the die manufacturing time for the housing is reduced, as a result of which the entire development process for the adjustment drive is reduced and as a result of which customer-end changes, in particular to the interface, can be implemented very much more quickly. All these advantages are achieved by an adjustment drive according to the invention comprising an electric motor, an output shaft, a printed circuit board and a connection interface. In this case, the printed circuit board makes contact with the electric motor and the electric motor is designed to drive the output shaft. Furthermore, according to the invention, the connection interface comprises a direct plug connection with contact-making pads directly on the printed circuit board, with the contact-making pads being designed to make direct contact with spring contacts of a plug. According to the invention, the printed circuit board is arranged at an angle obliquely to a plane which lies perpendicular to the output shaft.

Particularly preferably, the angle of the printed circuit board is selected such that the contact-making pads are seated centrally in the connection interface. On account of this oblique arrangement of the printed circuit board, the contact-making pads can be positioned with a sufficient space from an upper and lower end of a housing of the adjustment drive. Particularly when the adjustment drive is provided as a window lifter in a vehicle door, it is necessary to limit the generally accessible installation space or the extent of the adjustment drive at least in the direction of the thickness of the door. In order to now make the position of the contact-making pads on the printed circuit board flexible and therefore to ensure there is a sufficient amount of freedom in terms of design for the customer-end or vehicle-end plug with the spring contacts, it is particularly advantageous to arrange the printed circuit board obliquely.

In a preferred embodiment, provision is made for the connection interface to be designed to receive a plug, wherein the contact-making pads are designed to make contact with spring contacts of the plug. A plug, which is connected to the connection interface at the customer- or vehicle-end, has projecting plug pins. These plug pins extend as far as the printed circuit board when the plug is connected to the connection interface, and therefore the spring contacts are connected to the contact-making pads directly on the printed circuit board. It is no longer necessary to solder or press projecting pins or spring contacts onto or into the printed circuit board of the adjustment drive.

In a further preferred refinement, the adjustment drive comprises a housing. This housing accommodates the printed circuit board and at least part of the electric motor, wherein an armature shaft of the electric motor is perpendicular to the output shaft. Furthermore, the printed circuit board is at an angle of between 1 to 10° to the plane which lies perpendicular to the output shaft, and therefore an extent of the housing and of the electric motor in a direction perpendicular to this plane is as low as possible. When the adjustment drive is used as a window lifter in a vehicle door, this direction is perpendicular to the plane of the thickness of the door. That is to say, an extent of the adjustment drive in this direction should be as low as possible. Depending on the magnitude selected for this angle between the printed circuit board and the plane perpendicular to the output shaft, the contact-making pads can be positioned within this limited installation space and therefore a flexible direct plug connection can be ensured.

It is further preferred for the connection interface to comprise a plug collar on an outer face of the housing, wherein the plug collar does not extend in the direction perpendicular to the plane further than the housing itself, and wherein the contact-making pads are arranged centrally with respect to the plug collar. This plug collar is, in particular, designed as a closed, projecting and oval ring, or as a square with rounded corners, on the outer face of the housing and therefore forms a receptacle for the customer- or vehicle-end plug. In order for the spring contacts to be able to be arranged relatively centrally in the plug, the printed circuit board and therefore the contact-making pads are advantageously arranged centrally within the plug collar. In order to again not exceed the installation space within a vehicle door, it is advantageous for the plug collar to not exceed an extent of the housing in the direction perpendicular to the plane.

In a preferred embodiment, the plug collar, designed as an oval ring or as a square with rounded corners, is arranged obliquely to a plane which lies perpendicular to the output shaft. In particular, the longitudinal sides of the plug collar are parallel to the printed circuit board.

In a further advantageous refinement, provision is made for the electric motor to comprise a brush support and a pole housing, wherein the brush support is inserted into the housing and the pole housing adjoins the brush support outside the housing. In particular, the pole housing is screwed to the housing and/or to the brush support. By virtue of this arrangement of the brush support in the housing, contact can be established between the printed circuit board and the brush support in a simple manner. To this end, the printed circuit board is advantageously located partially on or beneath the brush support.

In a further advantageous refinement of the electric motor used, the brush support has pins with press-in zones and/or solder zones for the purpose of making contact with the printed circuit board. This permits a flexible design of the connection between the printed circuit board and the electric motor or brush support.

In a further preferred refinement, provision is made for interference-suppression for the electric motor to be performed by means of a guide element in the brush support, wherein the guide element is designed to establish contact between the printed circuit board and the pole housing. This guide element therefore establishes a ground contact between the printed circuit board and the pole housing. This guide element or this earth contact is advantageously integrated in the brush support and establishes contact both with the printed circuit board and with the pole housing. These contacts between the printed circuit board and the guide element and between the guide element and the pole housing are advantageously of spring-like design.

In order for contact-making means to be possible between the printed circuit board and the brush support, corresponding cutouts are advantageously provided in the housing.

Furthermore, provision is preferably made for a transmitter magnet to be seated on the armature shaft of the electric motor, wherein the transmitter magnet interacts with a Hall sensor on the printed circuit board. As a result, a rotation position of the electric motor or output shaft can be detected and the adjustment drive is therefore preferably designed with a trapping-prevention function. To this end, the printed circuit board is advantageously located partially on or beneath the brush support, and therefore the Hall sensor is arranged as close to the transmitter magnet as possible.

A worm gear mechanism is advantageously provided between the electric motor and the output shaft. In this case, a worm shaft is seated on the armature of the electric motor. A corresponding worm gear is seated on the output shaft.

The invention also comprises a window lifter drive for use in a motor vehicle, comprising an adjustment drive as just described above, and a plug having projecting spring contacts, wherein the spring contacts protrude into the adjustment drive and are in direct contact with the contacting-making pads. The plug therefore has projecting spring contacts. These spring contacts come to lie directly on the contact-making pads on the printed circuit board. Therefore, it is not necessary for adjustment drive-end pins or spring contacts to be soldered to the printed circuit board. The spring contacts preferably do not project from the plug on their own, but rather are protected by plastic structures. These two-part plastic structures, above and beneath the spring contacts, project from the plug together with the spring contacts. It goes without saying that the advantageous refinements of the adjustment drive are correspondingly used in the window lifter drive.

BRIEF DESCRIPTION OF THE DRAWINGS

An exemplary embodiment of the invention will be described in detail below with reference to the accompanying drawings, in which.

DETAILED DESCRIPTION

An exemplary embodiment of the adjustment drive 1, designed as a window lifter drive, will be described in greater detail below with reference to FIGS. 1 to 5.

Figure 1:
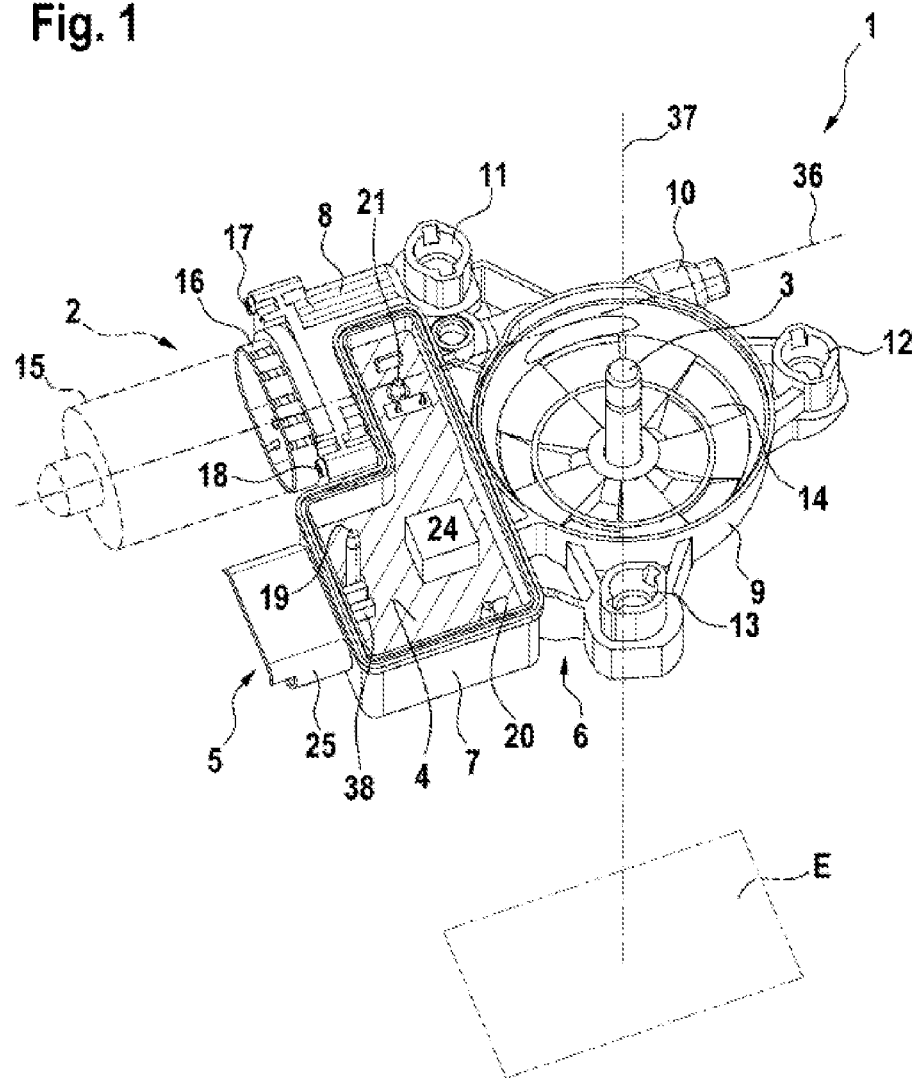
FIG. 1 shows an adjustment drive according to the exemplary embodiment with a partially open housing.

In this case, FIG. 1 shows the adjustment drive 1, having an electric motor 2, an output shaft 3, a printed circuit board 4 and a connection interface 5. In this case, the electric motor 2 extends along an armature axis 36. The output shaft 3 extends along an output axis 37. The armature axis 36 and the output axis 37 do not intersect but are perpendicular to one another. A plane E is perpendicular to the output axis 37.

The adjustment drive 1 also comprises a housing 6. This housing 6 is divided into a printed circuit board housing portion 7, a motor housing portion 8 and a gear mechanism housing portion 9. In this case, the housing 6 is of integral design. A window lifter drive shaft mount 10 is formed in the housing 6 or in the gear mechanism housing portion 9. This window lifter drive shaft mount 10 extends along the armature axis 36 following the electric motor 2. A window lifter drive shaft (not illustrated) is seated in this window lifter drive shaft mount 10 of the housing 6. Said window lifter drive shaft, for its part, is seated on an armature (not illustrated) of the electric motor 2. Furthermore, the gear mechanism portion 9 comprises a round clearance 14 which is designed to accommodate a worm gear. This window lifter drive gear (not illustrated) is seated in the clearance 14 on the output shaft 3 and engages with the window lifter drive shaft (not illustrated). As a result, the electric motor 2 can cause the output shaft 3 to rotate by means of the window lifter drive shaft and the window lifter drive gear.

The housing 6 also comprises a first screwing-on point 11, a second screwing-on point 12 and a third screwing-on point 13. The three screwing-on points 11, 12, 13 are distributed such that they lie in one plane, with only two of the three screwing-on points 11, 12, 13 being arranged along a line.

Figure 2:
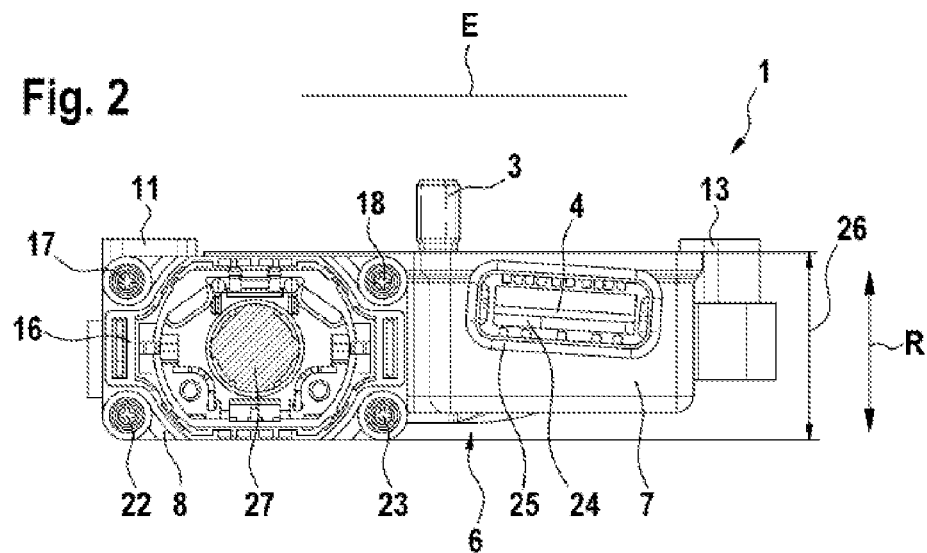
FIG. 2 shows a side view of the adjustment drive according to the exemplary embodiment.

A brush support 16 is inserted into the motor housing portion 8 of the housing 6. A pole housing, in the form of a pole pot 15, is mounted on this brush support 16. Said pole pot 15 is screwed onto the motor housing portion 8 by means of a first pole pot screwing means 17, a second pole pot screwing means 18, a third pole pot screwing means 22 and a fourth pole pot screwing means 23. The third and fourth pole pot screwing means 22, 23 are shown in FIG. 2. The armature (not illustrated) of the electric motor 2 with the corresponding windings extends through the pole pot 15 and the brush support 16 along the indicated armature axis 36.

A first holding peg 19, a second holding peg 20 and a third holding peg 21 are provided in the printed circuit board housing portion 7 of the housing 6. These three holding pegs 19, 20, 21 extend in a direction parallel to the output shaft 37. The printed circuit board 4 comes to lie on, or the printed circuit board 4 is clipped to, these three holding pegs 19, 20, 21. A relatively large component 24, in the form of a relay, is attached to the printed circuit board 4.

The connection interface 5 of the adjustment drive 1 is formed both on the printed circuit board housing portion 7 and on the printed circuit board 4. In this case, the connection interface 5 comprises an ovally encircling plug collar 25 on the outer face of the housing 6, in particular on the outer face of the printed circuit board housing portion 7, and also contact-making pads 38 directly on the printed circuit board 4. In this case, the plug collar 25 extends from an outer face of the housing 6 in a direction parallel to the armature axis 36.

FIG. 2 shows a side view of the adjustment drive 1 according to the exemplary embodiment. Said figure clearly shows how the housing 6 extends in an extent direction R. This extent direction R is parallel to the output axis 37 and extends along an extent length 26. If this adjustment drive 1 is now installed, for example, in the door of a motor vehicle, the thickness of the door restricts the maximum installation space and therefore prespecifies the extent length 26. The plug collar 25 has to be arranged within this extent length 26. A vehicle- or customer-end plug is fitted on this plug collar 25. Spring contacts are formed in this plug which is to be fitted, said spring contacts extending in the printed circuit board housing portion 7 and coming into contact with the contact-making pads 38. In order for the spring contacts of the plug to be able to be arranged relatively centrally in the plug, it is particularly important for the contact pads 38 to also be arranged centrally in the encircling plug collar 25. To this end, the printed circuit board 4 is provided with a certain slope, as described further in FIG. 3.

FIG. 2 also shows a transmitter magnet 27 which is seated on the armature (not illustrated) or on the armature axis 36. This transmitter magnet 27 interacts with a Hall sensor 39 (FIG. 3) on the printed circuit board 4. As a result, a trapping-prevention function can be realized in the adjustment drive 1.

Figure 3:
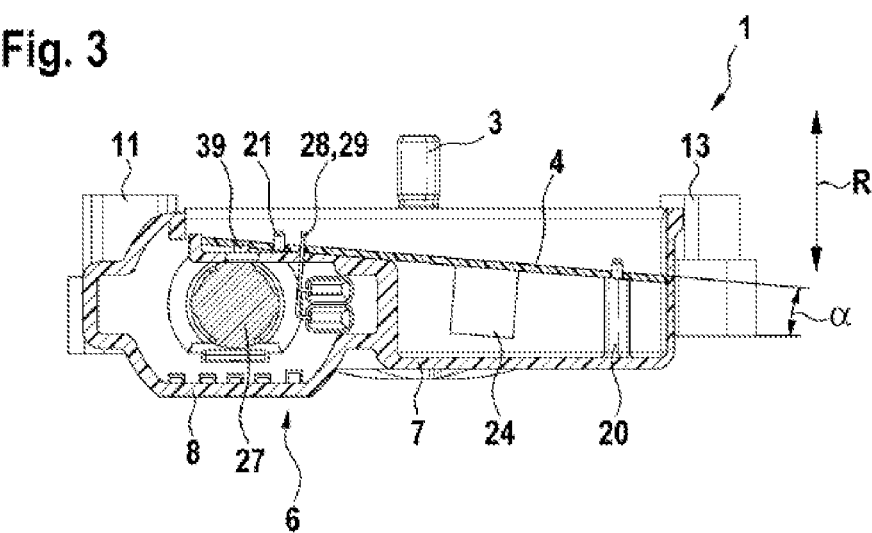
FIG. 3 shows a sectioned side view of the adjustment drive according to the exemplary embodiment.

FIG. 3 shows a section through the adjustment drive 1 according to the exemplary embodiment. Said figure clearly shows that the printed circuit board 4 is arranged obliquely, with the slope in this case being related to the plane E perpendicular to the output axis 37 and therefore producing the angle α of inclination of the printed circuit board 4. This angle α of inclination is realized by the holding pegs 19, 20, 21 being correspondingly dimensioned. FIG. 3 also shows that the brush support 16 makes contact with the printed circuit board 4 by means of a first pin 28 and a second pin 29. To this end, the printed circuit board 4 extends over the brush support 16 or lies above the brush support 16, so that firstly the contact connection by means of the pins 28 and 29 can be easily realized and therefore secondly the Hall sensor 39 lies on the printed circuit board 4 as close as possible to the transmitter magnet 27. If the printed circuit board 4 were now installed without the angle α of inclination or at an angle of α=0, the printed circuit board 4 would lie in the edge regions of the extent length 26. As a result, the contact-making pads 38 would likewise lie in the edge region of the extent length 26, as a result of which there would not be enough installation space for the plug collar 25.

Figure 4:
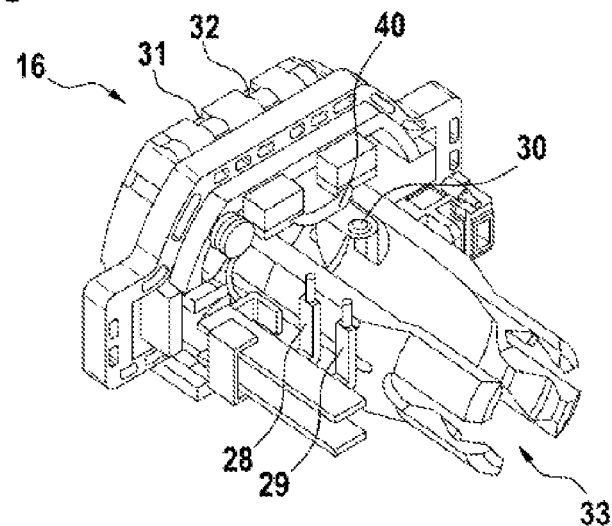
FIG. 4 shows a brush support as used in the adjustment drive according to the exemplary embodiment.

FIG. 4 shows, in detail, the brush support 16 as installed in the adjustment drive 1 according to FIGS. 1 to 3. Said figure clearly shows how the brush support 16 exhibits the first pin 28 and the second pin 29. The brush support 16 also comprises a guide element 40.

As already presented with reference to FIG. 3, the first pin 28 and the second pin 29 extend in the printed circuit board. The first pin 28 and the second pin 29 are pressed into or soldered onto the printed circuit board.

The guide element 40 comprises a first pole pot contact 31, a second pole pot contact 32 and a printed circuit board contact 30. As a result, the guide element 40 connects the printed circuit board 4 to the pole pot 15 in an electrically conductive manner, as a result of which ground compensation takes place and interference suppression in the electric motor 2 is possible. The pole pot contact-making means 31, 32 and the printed circuit board contact 30 are advantageously designed in a spring-like manner in this case.

The brush support 16 is hollow on the inside, as a result of which an armature receptacle 33 for accommodating the armature (not illustrated) is created.

Figure 5:
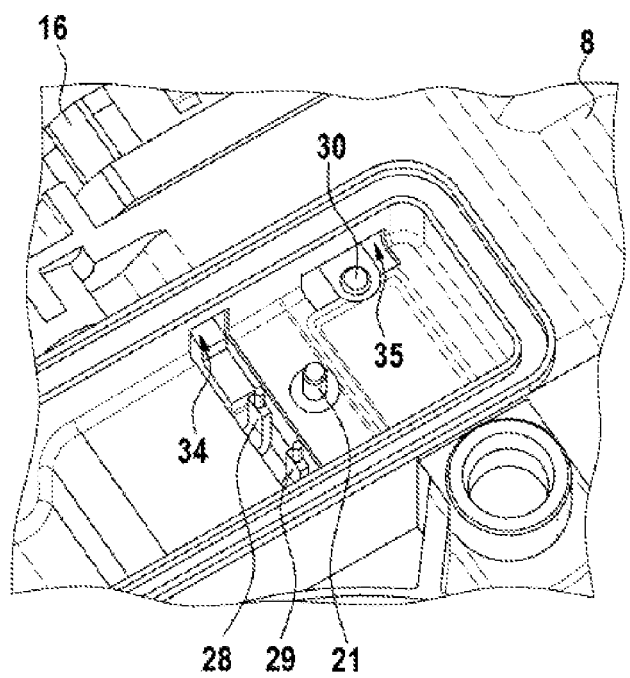
FIG. 5 shows a view of a detail of the adjustment drive according to the exemplary embodiment.

FIG. 5 shows a detail of the adjustment drive 1 from FIG. 1. Said figure clearly shows how a first cutout 34 and a second cutout 35 are provided in the housing 6. The first pin 28 and the second pin 29 extend through the first cutout 34 from the brush support 16 to the printed circuit board 4. The printed circuit board contact 30 of the guide element 40 extends through the second cutout 35 from the brush support 16, through the housing 6, to the printed circuit board 4.

In FIGS. 1 to 5, the printed circuit board housing portion 7 and the gear mechanism housing portion 9 are illustrated in a partially open manner. It goes without saying that corresponding covers are provided here, said covers covering both the printed circuit board 4 and the clearance 14 containing the worm gear.

The exemplary embodiment of the invention thus illustrated shows in great detail how it is possible to design an adjustment drive, in particular a window lifter, both in a cost-effective and customer-specific manner with limited installation space. In particular, dispensing with drive-end plug pins or spring contacts on the printed circuit board 4 and, instead, providing the contact-making pads 38 makes the direct plug connection possible. This has advantages, in particular, in respect of the flexible design of the housing 6 and the connection interface 5. As a result, customer-specific or vehicle-specific plug systems can be implemented in a highly flexible manner with relatively favorable dies.

The invention claimed is:

1. An adjustment drive (1) comprising an electric motor (2), an output shaft (3), a printed circuit board (4) and a connection interface (5),
    wherein the printed circuit board (4) makes contact with the electric motor (2) and the electric motor (2) is configured to drive the output shaft (3),
    wherein the connection interface (5) comprises a direct plug connection to contact-making pads (38) directly on the printed circuit board (4),
    wherein the contact-making pads are configured to make direct contact with spring contacts of a plug, and
    wherein the printed circuit board (4) is arranged at an angle (α) obliquely to a plane (E) which lies perpendicular to the output shaft (3).

2. The adjustment drive as claimed in claim 1, characterized in that the connection interface (5) is configured to receive a plug, wherein the contact-making pads (38) are configured to make contact with spring contacts of the plug.

3. The adjustment drive as claimed in claim 1, characterized in that the angle (α) is selected such that the contact-making pads (38) are seated centrally in the connection interface (5).

4. The adjustment drive as claimed in claim 1, characterized in that a transmitter magnet (27) is seated on the armature shaft (36) of the electric motor (2), wherein the transmitter magnet (27) interacts with a Hall sensor (39) on the printed circuit board (4).

5. A window lifter drive for use in a motor vehicle comprising an adjustment drive (1) as claimed in claim 1, and a plug having projecting spring contacts, wherein the spring contacts protrude into the adjustment drive (1) and are in direct contact with the contacting-making pads (38).

6. The adjustment device as claimed in claim 1, wherein the printed circuit board (4) contacts a brush support (16) via a first pin (28) and a second pin (29), at least one of the first pin (28) and the second pin (29) being press-fitted in or soldered onto the printed circuit board (4), and wherein the first pin (28) and the second pin (29) extend from the brush carrier (16) to the printed circuit board (4) via a cutout (34) provided in a housing that accommodates the printed circuit board (4).

7. The adjustment device as claimed in claim 1, wherein a guide element (40) connects the printed circuit board (4) to a pole pot (15) in an electrically conductive manner, whereby a ground compensation occurs and an interference suppression of the electric motor (2) occurs, and wherein a printed circuit board contact (30) of the guide element (40) extends from the brush carrier (16) to the printed circuit board (4) via a cutout (35) in a housing that accommodates the printed circuit board (4).

8. An adjustment drive (1) comprising an electric motor (2), an output shaft (3), a printed circuit board (4) and a connection interface (5),
wherein the printed circuit board (4) makes contact with the electric motor (2) and the electric motor (2) is configured to drive the output shaft (3),
wherein the connection interface (5) comprises a direct plug connection to contact-making pads (38) directly on the printed circuit board (4),
wherein the contact-making pads are configured to make direct contact with spring contacts of a plug, and
wherein the printed circuit board (4) is arranged at an angle ($\alpha$) obliquely to a plane (E) which lies perpendicular to the shaft (3),
characterized by a housing which accommodates the printed circuit board (4) and at least part of the electric motor (3), wherein an armature shaft (36) of the electric motor is perpendicular to the output shaft (3) and the angle ($\alpha$) is 1° to 10°, and therefore an extent (26) of the housing (6) and the electric motor (2) in the direction (R) perpendicular to the plane (E) is as low as possible.

9. The adjustment drive as claimed in claim 8, characterized in that the connection interface (5) comprises a plug collar (25) on an outer face of the housing (6), wherein the plug collar (25) does not extend in the direction (R) perpendicular to the plane (E) further than the housing (6), and wherein the contact pads (38) are arranged centrally with respect to the plug collar (25).

10. The adjustment drive as claimed in claim 9, characterized in that the plug collar (25) is arranged obliquely to the plane (E).

11. The adjustment drive as claimed in claim 9, characterized in that the electric motor (2) comprises a brush support (16) and a pole housing (15), wherein the brush support (16) is inserted into the housing (6) and the pole housing (15) adjoins the brush support (16) outside the housing (6).

12. The adjustment drive as claimed in claim 11, characterized in that the brush support (16) comprises pins (28, 29) with press-in zones and/or solder zones for the purpose of making contact with the printed circuit board (4).

13. The adjustment drive as claimed in claim 11, characterized in that interference suppression for the electric motor (2) is performed by means of a guide element (40) in the brush support (16), wherein the guide element (40) is configured to establish contact between the printed circuit board (4) and the pole housing (15).

14. The adjustment drive as claimed in claim 9, characterized in that the plug collar (25) is arranged at the angle ($\alpha$) to the plane (E).

15. An adjustment drive (1) comprising an electric motor (2), an output shaft (3), a printed circuit board (4) and a connection interface (5),
wherein the printed circuit board (4) makes contact with the electric motor (2) and the electric motor (2) is configured to drive the output shaft (3),
wherein the connection interface (5) comprises a direct plug connection to contact-making pads (38) directly on the printed circuit board (4),
wherein the contact-making pads are configured to make direct contact with spring contacts of a plug, and
wherein the printed circuit board (4) is arranged at an angle ($\alpha$) obliquely to a plane (E) which lies perpendicular to the output shaft (3),
characterized in that the angle ($\alpha$) is selected such that the contact-making pads (38) are seated centrally in the connection interface (5), and
characterized by a housing which accommodates the printed circuit board (4) and at least part of the electric motor (3), wherein an armature shaft (36) of the electric motor is perpendicular to the output shaft (3) and the angle ($\alpha$) is 1° to 10°, and therefore an extent (26) of the housing (6) and the electric motor (2) in the direction (R) perpendicular to the plane (E) is as low as possible.

16. The adjustment drive as claimed in claim 15, characterized in that the connection interface (5) comprises a plug collar (25) on an outer face of the housing (6), wherein the plug collar (25) does not extend in the direction (R) perpendicular to the plane (E) further than the housing (6), and wherein the contact pads (38) are arranged centrally with respect to the plug collar (25).

17. The adjustment drive as claimed in claim 16, characterized in that the plug collar (25) is arranged obliquely to the plane (E).

18. The adjustment drive as claimed in claim 17, characterized in that the electric motor (2) comprises a brush support (16) and a pole housing (15), wherein the brush support (16) is inserted into the housing (6) and the pole housing (15) adjoins the brush support (16) outside the housing (6).

19. The adjustment drive as claimed in claim 18, characterized in that the brush support (16) comprises pins (28, 29) with press-in zones and/or solder zones for the purpose of making contact with the printed circuit board (4).

20. The adjustment drive as claimed in claim 19, characterized in that interference suppression for the electric motor (2) is performed by means of a guide element (40) in the brush support (16), wherein the guide element (40) is configured to establish contact between the printed circuit board (4) and the pole housing (15).

21. The adjustment drive as claimed in claim 20, characterized in that a transmitter magnet (27) is seated on the armature shaft (36) of the electric motor (2), wherein the transmitter magnet (27) interacts with a Hall sensor (39) on the printed circuit board (4).

* * * * *